United States Patent [19]
Martin

[11] 3,786,299
[45] Jan. 15, 1974

[54] EHT SUPPLY PARTICULARLY FOR TELEVISION RECEIVERS

[75] Inventor: Kenneth Edward Martin, Horley, England

[73] Assignee: U. S. Philips Corporation, New York, N.Y.

[22] Filed: Mar. 3, 1972

[21] Appl. No.: 231,764

Related U.S. Application Data

[63] Continuation of Ser. No. 857,674, Sept. 15, 1969, abandoned.

[30] Foreign Application Priority Data

Sept. 16, 1968 Great Britain .................. 43,942/68

[52] U.S. Cl. .................................................. 315/29
[51] Int. Cl. .......................................... H01j 29/70
[58] Field of Search ...................... 315/28, 29, 27 R, 315/27 TD

[56] References Cited

UNITED STATES PATENTS

| | | | |
|---|---|---|---|
| 2,591,918 | 4/1952 | Cole et al. | 315/19 |
| 2,921,230 | 1/1960 | Hopengarten et al. | 315/29 |
| 3,609,446 | 9/1971 | Hursh | 315/27 TD |

*Primary Examiner*—Carl D. Quarforth
*Assistant Examiner*—J. M. Potenza
*Attorney*—Frank R. Trifari

[57] ABSTRACT

A circuit for supplying the final anode voltage to a CRT from a horizontal output transformer has a voltage tripler circuit. A circuit comprising a diode coupled in series with the parallel combination of a resistor and capacitor is coupled across the transformer. This prevents ringing during the scanning time, and hence, improves the regulation of the output voltage.

9 Claims, 3 Drawing Figures

PATENTED JAN 15 1974 3,786,299

INVENTOR.
KENNETH E. MARTIN
BY
AGENT

EHT SUPPLY PARTICULARLY FOR TELEVISION RECEIVERS

This is a continuation of application, Ser. No. 857,674, filed Sept. 15, 1969 now abandoned.

The invention relates to a circuit arrangement for EHT supply to the final anode of a picture display tube in a picture display device which is provided with a line output stage transformer, an EHT winding on the core of this transformer, a multiplier circuit formed by capacitors and unidirectional components which circuit is connected to the terminals of the EHT-winding in order to multiply the voltage peaks occurring across this winding and to rectify the multi-plied voltage.

Such a method of generating the EHT has been known for a long time. It is, for example, described in the book Television by F. Kerkhof and W. Werner, (1954) in the FIGS. 7.3–2 (page 196) and 7.3–8 (page 204). The output power in the colour picture display tube is large, namely in the order of 40 Watts. The EHT regulation must be good since otherwise the colour purity at large beam currents would deteriorate due to the decrease of the EHT. The greater the internal resistance of the EHT generator, the greater the decrease of the EHT as the beam current increases. Particularly in case of large powers this internal resistance will then have to be small for a good regulation. In addition, the EHT will be smaller when the internal resistance of the EHT-source is large and therefore the light output is not as large as in the case of a small internal resistance. Also, due to a large internal resistance the picture displayed may "breathe" as a result of variations in the taken beam current, that is to say the dimensions of the picture may vary. In fact, the EHT decreases when beam current increase. The internal resistance can slightly be reduced by using a multiplier circuit. It has, however, been found that the internal resistance thus obtained is larger at low beam currents than at high beam currents.

It is evident that this problem can be solved by connecting a resistor across the terminals of the EHT source, so that a current of at least 200 $\mu$A is always drawn from the multiplier circuit while ringing pulses, occurring in the EHT and the cause of which will further be explained, are also clipped off. Since the EHT required for the final anode in colour picture display tubes is, however, 25 kV, this would require an expensive chain of a large number of well insulated resistors. A better solution would be a voltage dependent resistor instead of the said chain, but such an element is bulky. It is alternatively possible to use a so-called ballast tube, but the drawback of the needless loss of power remains, while such a tube is not free from X-ray radiation which necessitates a screen. An object of the invention is to solve the mentioned problem in a simple manner without it being necessary to derive an additional drain and to this end, the circuit arrangement is characterized in that a load circuit consisting of at least one diode in series with the parallel arrangement of a resistor and a capacitor is connected between the terminals of the EHT winding and that the diode is given a direction of conduction such that ringing pulses occurring at the said winding and having a polarity opposite to that of the pulses occurring during the line flyback are clipped off.

It is to be noted that it has become common practice to tune line output transformers to frequencies one of which is the flyback frequency and the other is substantially an odd harmonic thereof. Such a tuning is described in the U.S. Pat. No. 2,805,384 and in the U.S. Pat. No. 3,500,116. Due to the tuning to the so-called fifth harmonic already a small internal resistance of the EHT source is obtained, because the peaks of the EHT pulses to be rectified have become flatter. As a result the picture "breathes" less when the taken beam current varies. However, since the said manner of tuning is never entirely ideal, oscillations may still occur right at the beginning of the line scan period.

In order that the invention may be readily carried into effect, a few embodiments thereof will now be described in detail, by way of example, with reference to the accompanying diagrammatic drawing, in which.

Figures 1, 2:
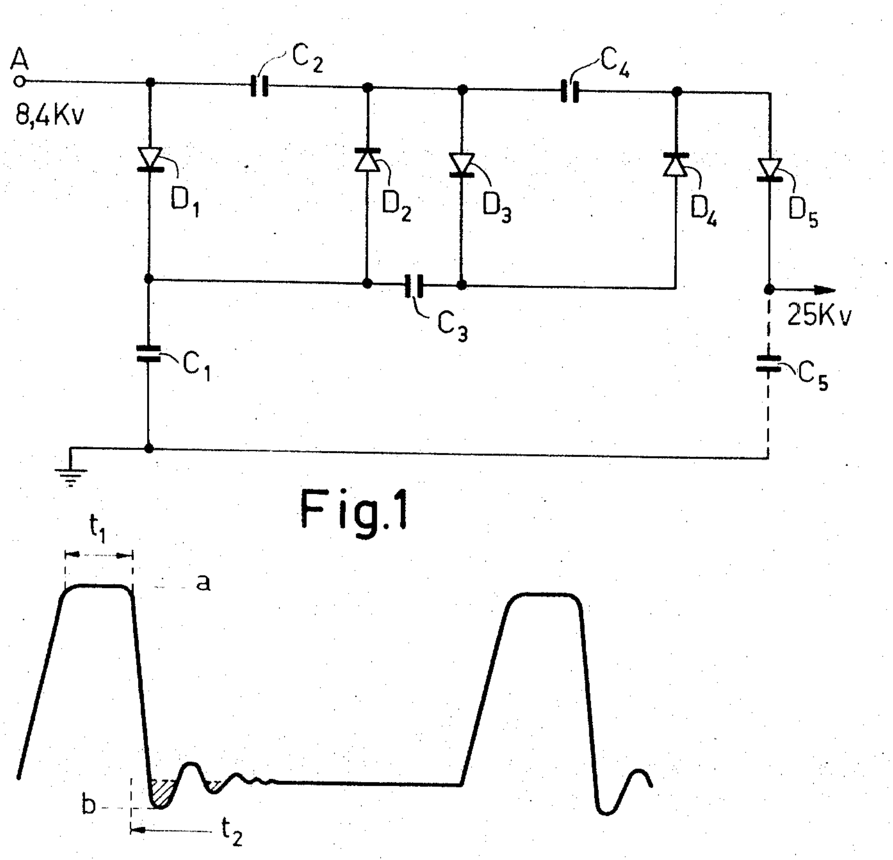
FIG. 1 shows a multiplier circuit of a known type, i.e. a tripler.
FIG. 2 shows the waveform of the input voltage of the circuit arrangement of FIG. 1.

FIG. 1, terminal A is connected to the EHT winding, whose other end is connected to earth, of the line output transformer across which the peak-to-peak amplitude of the voltage of the positive pulse occurring during the line flyback period has a value of, for example, 8.4 kV. The series arrangement of a diode $D_1$ and a capacitor $C_1$ is connected between terminal A and earth, the anode of diode $D_1$ being connected to terminal A. During the line flyback periods capacitor $C_1$ is charged to the maximum value of the voltage which is present at terminal A. During the line scan periods capacitor $C_2$ is charged through diode $D_2$ by the positive potential of capacitor $C_1$ because terminal A is then approximately at earth potential. When the line flyback pulses occur voltage pulses are applied In the capacitor $C_2$ to diode $D_3$, but they are superimposed on the direct voltage potential present across the terminals of this capacitor. As a result capacitor $C_3$ is charged to twice the value of the input pulse at terminal A. Ithe same manner capacitor $C_4$ is charged through diode $D_4$ during the line scan periods up to the direct voltage potential across capacitor $C_3$, while voltage pulses are applied through $D_5$ to the stray capacitance $C_5$ of the picture display tube during the flyback periods, the potential across $C_5$ being increased by the d.c. potential across capacitor $C_4$. These pulses are rectified by diode $D_5$ and capacitor $C_5$ is charged to a potential, *i.e.* the EHT potential, which is equal to substantially three times the amplitude of the voltage pulse at the input of the circuit. FIG. 2 shows the waveform present at the terminal A during the scanning and flyback periods, the aforementioned ringing pulses being shown at the beginning of the scan periods.

During the line flyback period diodes $D_1$, $D_3$ and $D_5$ conduct during time $t_1$ (FIG. 2), while diodes $D_2$ and $D_4$ conduct during the scanning period which starts at the instant $t_2$. The ratio between the periods of conduction of the said diodes depends on the EHT power being taken by the display tube. If the beam current is low, the diodes rectify the full amplitudes between points *a* and *b* of the waveform of FIG. 2. If the beam current exceeds the value of approximately 200 $\mu$A the ringing pulses shown in FIG. 2 after the instant $t_2$ are clipped off, but as a result thereof the EHT decreases by at least 2 kV. Once these ringing pulses have been clipped off, the EHT only decreases slightly with a further increase of the beam current.

Figure 3:
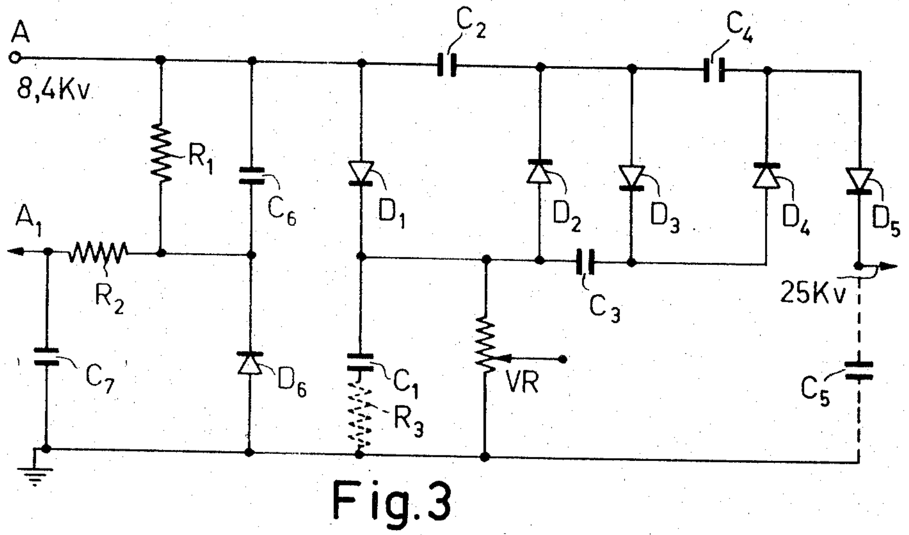
FIG. 3 shows an embodiment of the circuit arrangement according to the invention.

FIG. 3 shows an embodiment of the circuit arrangement according to the invention in which elements corresponding to those of FIG. 1 have the same reference numerals. Between terminal A, which is the voltage-conveying end of the EHT winding of a line output transformer not shown in the Figure, and ground there is provided the series arrangement of a resistor $R_1$ and a diode $D_6$ in such a manner that the anode of diode $D_6$ is connected to ground. Resistor $R_1$ is shunted by a capacitor $C_6$ and diode $D_6$ is shunted by the series arrangement of a resistor $R_2$ and a capacitor $C_7$.

When the ringing oscillation of the voltage at terminal A has a negative going portion, diode $D_6$ conducts resulting in a current flowing through the parallel arrangement of capacitor $C_6$ and resistor $R_1$ so that the negative ringing oscillations voltage is clipped off and cannot therefore contribute to the EHT which is developed across capacitor $C_5$. As a result the generated EHT will have substantially the same value at a small and a large beam current.

Due to capacitor $C_6$ there is produced a positive voltage at the cathode of diode $D_6$ which voltage is further smoothed by the series arrangement of $R_2$ and capacitor $C_7$. The first acceleration anode of a colour picture display tube of the shadow mask type requires a voltage in the order of 700 to 800 V. This voltage may advantageously be supplied by the direct voltage across capacitor $C_7$. For line output stages which include semiconductors, it is common practice to use a separate peak rectifier so as to obtain this voltage, and due to the step mentioned above, this separate rectifier may be omitted.

The focussing electrode of a colour picture display tube of the shadow mask type requires a potential which is approximately 5 kV and which can be derived either by means of a potential divider between the EHT and ground, or from a tap on the line output transformer. This voltage can now be derived by means of a potentiometer $V_R$ connected in parallel with capacitor $C_1$ of the multiplier circuit. The small current which flows through this potentiometer, also contributes to smoothing the peak of the line flyback pulse of FIG. 2, which causes a further reduction of the internal resistance of the EHT source.

Due to the choice of the ratio between the capacitances of capacitors $C_6$ and $C_2$ a certain extent of protection against a possible flashover in the picture display tube can be obtained for the circuit being shown to the left-hand side of point A in FIG. 3. When such flashover occurs, the EHT line, *i.e.* capacitors $C_5$, is short-circuited to ground. As a result thereof the charge of capacitors $C_1$, $C_3$ and $C_4$ flows away through diodes $D_2$, $D_4$ and $D_5$. However, since diode $D_1$ is blocked, the charge of capacitor $C_2$ cannot find a path other than the EHT winding through terminal A. The voltage across capacitor $C_1$ is substantially zero, so that a negatively directed current pulse arises at the input of the tripler circuit. A measured value thereof was approximately 10 A, which may result in damage of the line output transistor. If, however, the voltage across capacitor $C_2$ becomes more negative than the voltage across capacitor $C_6$, diode $D_6$ conducts and the series arrangement of capacitors $C_2$ and $C_4$ forms capacitor $C_6$ a capacitive potential divider so that only a small part of the voltage cause by the flashover is conveyed to terminal A when the capacitance of capacitor $C_6$ has been rendered much larger than that of capacitor $C_2$. The line output transistor is somewhat protected in this manner.

A further step may be to include a resistor $R_3$ between capacitor $C_1$ and ground, so that the discharge current flowing through this capacitor is reduced. For resistor $R_3$ a value is chosen, for example, 470Ω which is much larger than that of the discharge path through the display tube, which is approximately 50Ω. When a breakdown occurs, a negative voltage is produced across resistor $R_3$ so that diode $D_1$ becomes conducting. Capacitor $C_6$ can therefore be discharged which results in a still better protection of the line output transistor.

The following components were used in one embodiment of the circuit arrangement according to the invention:

Capacitors $C_1$, $C_2$, $C_3$ and $C_4$ } tripler LP 1174
Diodes $D_1$, $D_2$, $D_3$, $D_4$ and $D_5$ } (Mullard Ltd)
Capacitor $C_6$ : 10*n*F.
Capacitor $C_7$ : 1*n*F
Diode $D_6$ : Mullard type BY 140.
Resistor $R_1$ : 500 kΩ.
Resistor $R_2$ : 10 MΩ.

What is claimed is:

1. A circuit for supplying ultor electrode voltage to a display tube from a horizontal output transformer output winding comprising means having an input coupled to said output winding and an output coupled to said electrode for multiplying and rectifying the winding flyback pulses; and means coupled to said output winding for eliminating ringing pulses occuring at said output winding and having a polarity opposite to that of said flyback pulses, said eliminating means comprising a diode, a resitor, and a capacitor coupled in parallel with said resistor, said resistor and capacitor being coupled in series with said diode, whereby a junction is formed and the ultor voltage is substantially a constant regardless of the ultor current.

2. A circuit as claimed in claim 1 further comprising means for obtaining an anode supply voltage from said junction.

3. A circuit as claimed in claim 2 wherein said obtaining means comprises a second resistor coupled to said junction, and a second capacitor coupled to said second resistor.

4. A circuit as claimed in claim 1 wherein said multiplying and rectifying means comprises a plurality of diodes and capacitors arranged in a voltage multiplier configuration, one of said capacitors being coupled to said eliminating means capacitor, another one of said capacitors and one of said diodes being coupled in series and to said winding.

5. A circuit as claimed in claim 4 wherein the capacitance of said eliminating means capacitor is substantially larger than the capacitance of said capacitor coupled thereto.

6. A circuit as claimed in claim 4 further comprising a resistor coupled in series with said diode and capacitor that are coupled to said winding.

7. A circuit as claimed in claim 1 wherein said display tube comprises a color picture tube.

8. A circuit as claimed in claim 1 wherein said multiplying and rectifying means multiplies said winding voltage approximately by a factor of three.

9. A circuit for supplying ultor electrode voltage to a display tube from a horizontal output transformer output ultor tap comprising means having an input coupled to said output and an output coupled to said electrode for multiplying and rectifying the winding flyback pulses; and means coupled to said output ultor tap for eliminating ringing pulses occurring at said output ultor tap and having a polarity opposite to that of said flyback pulses; whereby the ultor voltage is substantially a constant regardless of the ultor current.

* * * * *